Oct. 25, 1955  YAO TZU LI  2,721,918
ELECTRIC STRAIN GAGE
Filed May 1, 1953
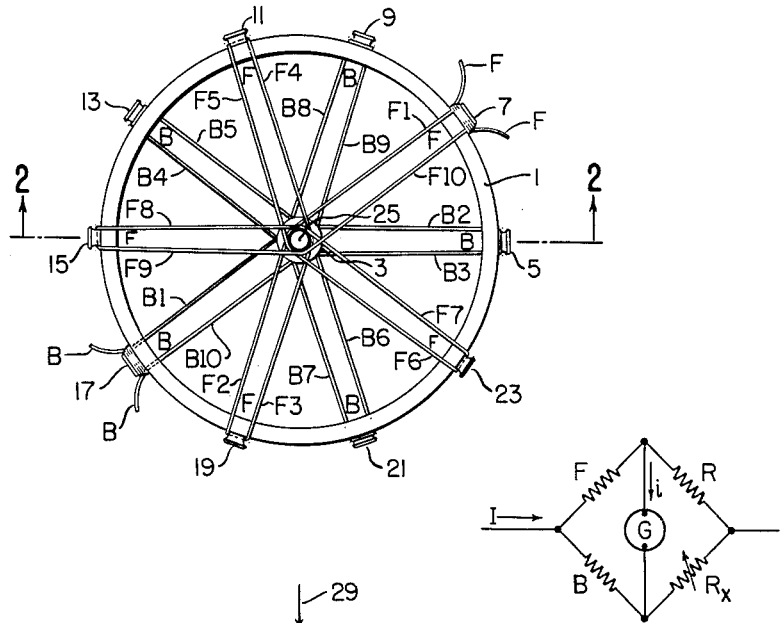
Fig. 1
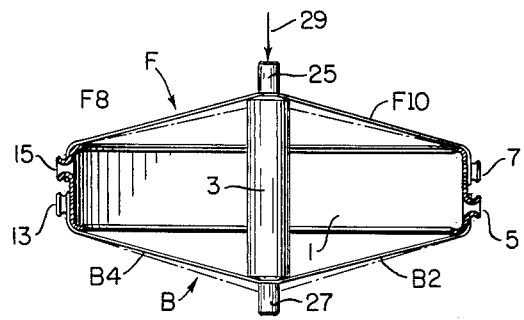
Fig. 2
Fig. 3
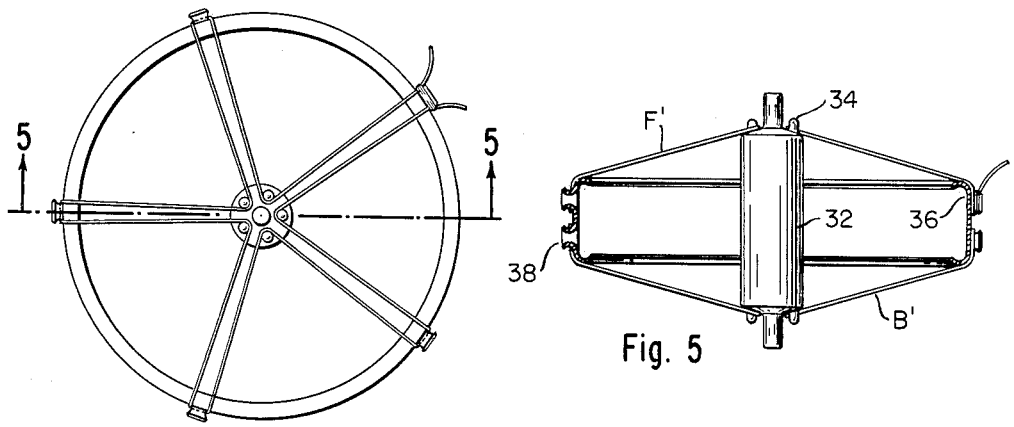
Fig. 4
Fig. 5
*INVENTOR.*
YAO TZU LI
BY Kenway Jenney
Walter & Hildreth
ATTORNEYS United States Patent Office 2,721,918
Patented Oct. 25, 1955

2,721,918
ELECTRIC STRAIN GAGE
Yao Tzu Li, Watertown, Mass.

Application May 1, 1953, Serial No. 352,351

3 Claims. (Cl. 201—63)

The present invention relates to a force transducer of the strain gage type and more particularly to a coaxial structure carrying wires whose electrical resistances are varied by changes in length, whereby measurements of force, acceleration, pressure and the like may be accomplished by the measurement of the resistance changes.

The present invention is of the unbounded type of strain gage, in which the strain-sensitive wire is supported only at intervals. In such strain gages, the basic elements are a fixed frame and movable armature, to each of which the strain-sensitive wire is fixed. In operation, the quantity to be measured (e. g., displacement) is made to cause a movement of the armature relative to the frame, thereby causing a strain in the wire and a change in its resistance.

In the construction of strain gages, there are two principal problems. The first concerns the mass of the armature: the armature, being heavier than the wires, introduces an inertia factor which may seriously limit the high-frequency response of the system. The second problem is to compensate for temperature variations.

It is, therefore, the principal object of this invention to provide a strain gage which avoids these difficulties, which operates satisfactorily at high frequencies and which is self-compensating for temperature variations between the location of the strain wires and the location of the measuring bridge circuit.

It is also an object of the present invention to provide a strain gage of higher sensitivity than those of conventional design.

In furtherance of these objects, the chief feature of the invention is the use of a supporting ring and a central spindle or armature, between which the wires are wound in a generally radial fashion. A second feature is the arrangement of two wire resistances wound in such manner that axial motion of the armature results in an increase in the resistance of one and a decrease in the resistance of the other, with both resistances sensitive in the same direction to temperature changes, whereby temperature compensation is effected.

These and other features will be apparent from a consideration of the accompanying drawings in which:

Fig. 1 is a plan view of one form of strain gage according to the present invention;

Fig. 2 is a sectional elevation of the gage along line 2—2 of Fig. 1;

Fig. 3 is a diagram of the measuring bridge circuit; and

Figs. 4 and 5 are a plan and sectional elevation (on line 5—5), respectively, of a modified form of gage.

Figs. 1 and 2 show the construction of the strain gage, which is similar in appearance to a bicycle wheel. The gage comprises an annular member 1 and a hub member 3 in the form of an axial spindle. Between the members 1 and 3 the strain-sensitive wires are strung in the manner of "spokes." The annular member and the spindle are preferably both made of an insulated metal such as surface-oxidized steel to prevent short-circuiting the resistance wires. The annular member 1 is provided with a series of studs or winding posts 5, 7, 9, 11, 13, 15, 17, 19, 21 and 23, adapted to support the strain-sensitive wires. The posts, as shown in Fig. 2, are conveniently struck up from the metal ring. The spindle member 3 is provided with the tips 25 and 27, of reduced diameter about which the resistance wires may be wound.

There are two strain-sensitive wires in the gage. One, denoted the front winding F, is associated with the tip 25 of the spindle and the winding posts 7, 11, 15, 19 and 23, which are placed near the upper surface of the ring member 1. The other, denoted the back winding B, is associated with the tip 27 and the posts 5, 9, 13, 17 and 21, which are placed near the lower surface of the ring member 1. (The various segments of the windings are denoted by F or B followed by a numeral, as $F_2$ or $B_4$.) It should be noted that the number of winding posts shown (ten) is not critical, nor is the configuration critical as shown in Fig. 1, in which the posts are preferably staggered, and not placed one over the other.

The strain-sensitive windings should be insulated from each other, as, for example, by lacquer or enamel coating, or by sheathing wires F and B at the points where their different segments touch, respectively, the tips 25 and 27 of the spindle member.

The windings are conveniently laid out as follows. The front wire F is attached to the post 7 from which the segment F1 runs to the tip 25 and continues as segment F2 to the post 19. From the binding post 19, the front wire proceeds in segment F3 to the center tip again and runs off in segment F4 to the post 11. From post 11 to the center tip 25 runs the segment F5 which continues into segment F6, attached to the post 23. The front wire F continues in segment F7 (from post 23 to center), segment F8 (from center to post 15), F9 (from post 15 to center) and F10 (from center to post 7), the starting place. The resistance of the wire F is measured between the two ends of the wire at the post 7. The back wire B is similarly wound in the following sequence: binding post 17 — B1 — center — B2 — post 5 — B3 — center — B4 — post 13 — B5 — center — B6 — post 21 — B7 — center — B8 — post 9 — B9 — center — B10 — post 17. The resistance of wire B is taken as the resistance between its two ends at 17.

The particular winding arrangement shown herein is not critical, and any consistent sequence may be used. The wire is required to make some bend around the tip of the spindle. In Fig. 1 the bend is relatively small, and this facilitates the construction of the device, since the wires themselves are relied on to hold the spindle member 3 in the axial center of the ring 1. The spindle member 3 is longitudinally centered in the ring 1 by winding the wires F and B with equal tensions; thus as shown in Fig. 2, the spindle projects equally from the central plane of the ring.

The operation of the strain gage can be seen from Figs. 2 and 3. In Fig. 2, both wires F and B are initially under tension. A force, represented by the arrow 29 deflects the spindle member 3 downward. It can be seen from the trigonometry of Fig. 2 that, for small deflections, the amount of deflection of the member 3 will be proportional to the force applied, and that the change in length, the strain, of the wires F and B will also be proportional to the force applied. The wire F will contract and the wire B will expand. The outer member 1 will have only a negligible deflection since the tension forces in the wires F and B are applied to it radially. The wire F will relax its tension by an amount equal and opposite to the amount the wire B increases its tension, and the sum of their changes in tension will be proportional to the applied force.

Fig. 3 shows the bridge circuit for measuring with the strain gage the resistance of the front winding is designated F, the back winding resistance is B, the fixed bridge resistance is R and the variable bridge resistance is designated $R_x$. A fixed current I is applied to the bridge and a galvanometer G is connected as shown for indicating the unbalance current $i$. If F is $F_0 - \Delta F$ where $\Delta F$ is a decrease in resistance due to the applied force and B is similarly $B_0 + \Delta B$, and $R_x$ is made equal to R, then the unbalance current $i$ may be written very nearly as:

$$i = I \frac{\Delta B + \Delta F}{4R}$$

for the simplified case where $F_0 = B_0 = R$.

If, on the other hand, the galvanometer is nulled continuously by varying $R_x$, the condition for balance in this simplified case is:

$$\frac{R_x}{R} \frac{B_0 + \Delta B}{F_0 - \Delta F}$$

In either case, it will be seen, that the increase in B and the decrease in F are additively effective, so that there is a high sensitivity to an applied force.

If, on the other hand, both F and B are subjected to a temperature change, both will increase or decrease in resistance by the same proportion. In that case, $\Delta F$ and $\Delta B$ subtract from each other so that neither the unbalance current $i$ nor the resistance value $R_x$ for balance is affected. This compensation is theoretically complete in the ideal case described where $F_0 = B_0 = R = R_x$, but is also effective in other arrangements. In general, temperature effects are compensated out because of resistance changes in the same direction (increase or decrease), whereas an applied force (as shown in Fig. 2) decreases one resistance and increases the other. The instrument is also insensitive to forces other than axial. Thus torsional or lateral forces on the spindle act equally on both wires and their effects are balanced out.

A modified, and in some respects, preferable, form of gage is shown in Figs. 4 and 5, in which there is a central hub or spindle 32 having pins 34, which may either be formed integral therewith, as shown, or inserted in the body thereof. Conveniently, the hub 32 may be molded of glass or other insulating material. The ring member 36 is similar to the member 1 of Fig. 1, except, as here shown, the winding posts 38 of the front and back windings are placed in the same angular positions, instead of being staggered.

The front and back windings F' and B' are simply wound on the pins and winding posts in the manner clearly shown in Fig. 4, whereby a "spoke" extends from one pin to a winding post and back to the next pin. As in the construction previously described, the wires and the central member are mutually supporting. The operation is identical in respect to sensitivity to axial motion, and compensation for temperature changes.

Having thus described my invention, I claim:

1. A strain gage comprising a ring member having a plurality of winding posts thereon, a central spindle having a wire-holding shoulder at each end, and two strain-sensitive resistance wires, each wound under tension between the winding-posts and one of the shoulders to hold the spindle centered within the ring member.

2. A strain gage comprising a ring member, a plurality of winding posts thereon arranged around the periphery in two parallel sets, a spindle member having a wire-retaining shoulder at each end, and two strain-sensitive resistance wires, each wound under tension between one set of winding-posts and one of the shoulders to hold the spindle centered within the ring member.

3. A strain gage comprising a ring member, a plurality of winding posts thereon arranged around the periphery in two parallel sets, a spindle member having a plurality of wire-retaining pins, and two strain-sensitive wires, each wound under initial tension between the pins on the spindle members and one set of winding posts.

References Cited in the file of this patent

UNITED STATES PATENTS 2,435,231    McPherson _____ Feb. 3, 1948